March 22, 1927.
M. STREIT
CHANGE SPUR GEARING
Filed Sept. 27, 1926
1,622,264
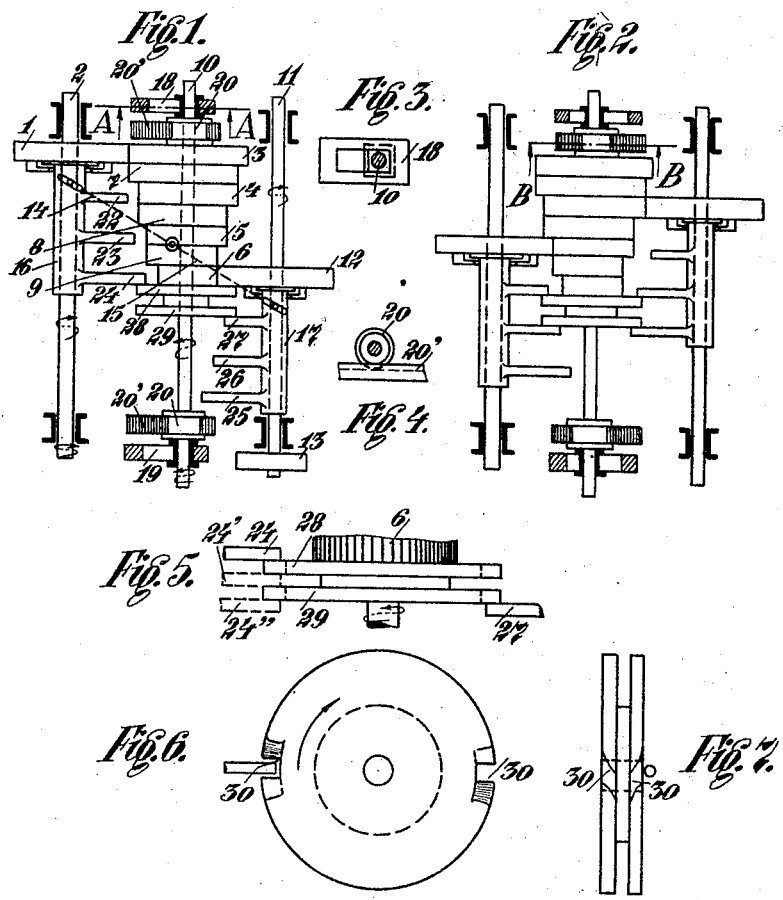

Patented Mar. 22, 1927.

1,622,264

UNITED STATES PATENT OFFICE.

MAX STREIT, OF BRESLAU, GERMANY.

CHANGE-SPUR GEARING.

Application filed September 27, 1926, Serial No. 138,024, and in Germany March 15, 1926.

This invention relates to a change spur gearing, especially for motor driven vehicles, comprising one eccentric transmitting spur gear between every two adjacent spur gears of different size of one set, the spur gears and their shafts designed to come into gear being adapted to be adjusted accordingly.

The change spur gearings of this type of known construction require, for intercepting the lateral pressure, an additional set of step wheels with corresponding auxiliary mechanism. To avoid this inconvenience two spur wheels shiftable simultaneously in axial direction, are arranged, according to the invention, on opposite sides of the set of gear wheels having eccentric intermediate wheels, the set of gear wheels being adjustable in lateral directions between these shiftable spur wheels. Herefrom results that, as these two spur wheels engage with different wheels of the gear set, in opposition to change spur gearings of known type, at the same time a double wheel transmission is effected instead of a single one.

An embodiment of the invention is illustrated, by way of example, in diagrammatical view on the accompanying drawing, in which—

Figs. 1 and 2 show in plan view the change spur gearing in two different positions, Figs. 3 and 4 are sections on lines A—A and B—B respectively of Figs. 1 and 2.

Figs. 5 to 7 show on larger scale in plan view, front elevation and side elevation respectively one element of Fig. 1.

The driving wheel 1 is mounted on a stationary shaft 2 so that it can be shifted in axial direction and it gears, in the position of the elements shown in Fig. 1, with the first wheel 3 of a set of wheels 3 to 9 made in one piece and keyed on an intermediate shaft 10 which is adapted to be reciprocated in lateral directions, the coaxial wheels 3 to 6 of said set forming the change wheels between which the eccentrically arranged wheels 7 to 9 are located. In the position shown in Fig. 1 a spur wheel 12 axially shiftable on a stationary shaft 11 meshes with wheel 6. The shaft 11 carries further a spur wheel 13 which transmits the rotating movement upon a wheel set, which is not shown in the drawing, and upon which act the mechanism for free run, going ahead or going back. The meshing of the wheels 1 and 3, 6 and 12 produces the first, that of the wheels 1, 4, 5 and 12 the second, that of the wheels 1, 5, 4 and 12 the third and that of the wheels 1, 6, 3 and 12 the fourth speed of the change spur gearing. The shifting of wheels 1 and 12 in opposite directions is controlled, in the form of construction shown, by the adjusting of a two-armed lever 14, 15 the ends of which are hinged to sleeves 16, 17 coupled to the wheels 1 and 12 for shifting in axial direction but secured against rotation; these sleeves will be hereinafter mentioned again. In order to effect, at the changing of the meshing, the lateral shifting of shaft 10 and of the wheels on the same, the bearings for the ends of shaft 10 (see Fig. 3) are movably guided in transverse guides 18 and 19 and shaft 10 carries further spur wheels 20, which (Fig. 4) mesh each with a transverse rack 20'.

The changing of meshing takes place through the intermediary of the eccentrically arranged wheels 7 to 9, a certain rotating adjusting of the set of wheels 3 to 9 being necessary in order to bring the wheels 1 and 12 by axial displacement from the gearing with the centric wheels 3 to 6 into gearing with the eccentric wheels 7 to 9 at the side of these centric wheels. Arrangements are preferably provided which permit of axial shifting of the wheels 1 and 12 only if these wheels are in a predetermined rotatable position. Such arrangement is provided also in Figs. 1 and 2 and shown diagrammatically on larger scale in Figs. 5 to 7.

The sleeves 16 and 17, mentioned above, shiftable together with the wheels 1 and 12 on the shafts 2 and 11 but secured against rotation, have lateral arms 22 to 24 and 25 to 27 of different length, which, at the axial displacement of the wheels 1 and 12 and at the lateral shifting of the shaft 10 together with the set of wheels 3 to 9, come successively into the path of two disks 28 and 29 which are mounted at a certain distance the one from the other on the shaft 10 and rotate with this shaft. These disks 28 and 29 have apertures 30 at suitable points of the circumference which, if they come into register at the rotation of the disks with the lateral arms 22 to 24 or 25 to 27 standing in front of these apertures, permit of the passing through of these arms. If, for instance, (Fig. 5) the arm 24 is on the one side of disk 28 it can, when an aperture of the disk moves along said arm be pushed through this aperture into the position 24' and, when an aperture of disk 29 moves along it can be pushed through this aperture into the position 24″. Herefrom results, that shifting of the sleeves 16 and 17 and consequently of the spur wheels 1 and 12 is possible only if, at the rotation of shaft 10, an aperture 30 stands opposite the lateral arm. If care has been taken that the sleeves 16 and 17 are submitted, at the moment when the speed is being changed, to a suitable pressure, for instance to the pressure of springs, which tend to effect the axial displacement of the sleeves, a lateral arm, for instance arm 24, will pass, when an aperture 30 moves along this arm, from one side of the disk to the other side of the same. The thickness of the disks and of the lateral arms is selected so that, at the passing of the lateral arm 24 into the position 24′ or from this position into the position 24″, the spur wheels 1 and 12 are shifted accurately through the thickness of one wheel, so that for instance when arm 24 is moving into the position 24′, the wheel 1 disengages from wheel 3 and comes into gear with wheel 7 and, when arm 24 moves from position 24′ into the position 24″, the arm 1 disengages from wheel 7 and comes into gear with wheel 4.

I claim:—

1. A change spur gearing especially for motor driven vehicles, comprising in combination a stationary driving shaft, a driving wheel shiftable on said shaft in axial direction, an intermediate shaft shiftable in lateral directions, a set of wheels forming one element mounted on said intermediate shaft said set of wheels consisting of three coaxial wheels of different diameters serving as transmission wheels and of three eccentric wheels of different diameters alternating with said coaxial wheels and serving as change wheels, a driven shaft, a spur wheel on said driven shaft shiftable in axial direction and designed to come into gear with any of said coaxial wheels, a two-armed lever for shifting said driving wheel and said driven wheel in opposite directions on their respective shafts to change from the first to the second, third or fourth speed and inversely, transverse guides for the bearings of said intermediate shaft, a pinion on each end of said intermediate shaft, transverse racks one for each pinion meshing with said rack, and means for controlling the lateral displacement of said intermediate shaft at the speed changing.

2. A change spur gearing especially for motor driven vehicles, comprising in combination a stationary driving shaft, a driving wheel shiftable on said shaft in axial direction, an intermediate shaft shiftable in lateral directions, a set of wheels forming one element mounted on said intermediate shaft said set of wheels consisting of three coaxial wheels of different diameters serving as transmission wheels and of three eccentric wheels of different diameters alternating with said coaxial wheels and serving as change wheels, a driven shaft, a spur wheel on said driven shaft shiftable in axial direction and designed to come into gear with any of said coaxial wheels, a two-armed lever for shifting said driving wheel and said driven wheel in opposite directions on their respective shafts to change from the first to the second, third or fourth speed and inversely, transverse guides for the bearings of said intermediate shaft, a pinion on each end of said intermediate shaft, transverse racks one for each pinion meshing with said rack, and means for controlling the lateral displacement of said intermediate shaft at the speed changing, consisting of a sleeve connected to said driving wheel and shiftably but not rotatably mounted on said driving shaft, three inwardly projecting lateral arms of different length on said sleeve, a sleeve connected to said driven wheel and shiftably but not rotatably mounted on said driven shaft, three inwardly projecting lateral arms of different length on said sleeve of said driven wheel. Two disks keyed on said intermediate shaft behind said set of change wheels spaced the one from the other for the thickness of a change wheel and having each two apertures at opposite points of its circumference and serving as passages for said lateral arms of said sleeves from one change position into the other change position.

In testimony whereof I affix my signature.

MAX STREIT.